(12) United States Patent
Takano

(10) Patent No.: US 8,072,961 B2
(45) Date of Patent: *Dec. 6, 2011

(54) COMMUNICATION SYSTEM, A COMMUNICATION METHOD, AND A COMMUNICATION APPARATUS WITH REQUEST TO SEND FEATURES

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/621,756

(22) Filed: Nov. 19, 2009

(65) Prior Publication Data

US 2010/0061357 A1 Mar. 11, 2010

Related U.S. Application Data

(63) Continuation of application No. 10/821,884, filed on Apr. 12, 2004, now Pat. No. 7,701,920.

(30) Foreign Application Priority Data

Apr. 28, 2003 (JP) ................................. 2003-123280

(51) Int. Cl.
*H04B 7/212* (2006.01)
*H04W 72/04* (2009.01)
(52) U.S. Cl. ..................... 370/348; 370/230; 455/452.1; 455/41.2
(58) Field of Classification Search .................. 370/230, 370/278, 280, 312, 329, 338, 348, 445; 455/41.1, 455/273, 101, 434, 455, 562.1, 450, 452.1, 455/453

See application file for complete search history.

(56) References Cited

U.S. PATENT DOCUMENTS

| | | | |
|---|---|---|---|
| 6,983,167 | B2 | 1/2006 | Adachi et al. |
| 7,117,018 | B2 | 10/2006 | Lewis |
| 7,212,499 | B2 | 5/2007 | Hoffmann et al. |
| 7,305,004 | B2 | 12/2007 | Sherman |
| 7,339,892 | B1 | 3/2008 | Engwer et al. |
| 7,342,876 | B2 | 3/2008 | Bellur et al. |
| 7,580,674 | B2 | 8/2009 | Gorsuch et al. |
| 2002/0181435 | A1 | 12/2002 | Miklos et al. |
| 2003/0119558 | A1 | 6/2003 | Steadman et al. |
| 2004/0196834 | A1 | 10/2004 | Ofek et al. |
| 2004/0209571 | A1 | 10/2004 | Saegrov |
| 2006/0029073 | A1 | 2/2006 | Cervello et al. |

FOREIGN PATENT DOCUMENTS

| | | |
|---|---|---|
| JP | 05-347623 | 12/1993 |
| JP | 09-219615 | 8/1997 |
| JP | 2002-051375 | 2/2002 |
| JP | 2003-124878 | 4/2003 |
| JP | 2005-159504 | 6/2005 |
| JP | 2006-060386 | 3/2006 |

OTHER PUBLICATIONS

Hideaki Matsue, et al. "802.11 High Speed Wireless LAN Textbook", IDG Japan Co., Ltd., Mar. 29, 2003, 4 pages.

*Primary Examiner* — Blane J Jackson
(74) *Attorney, Agent, or Firm* — Oblon, Spivak, McClelland, Maier & Neustadt, L.L.P.

(57) ABSTRACT

A communication system for carrying out data communication among a plurality of communication stations is disclosed in which a first communication station for transmitting to other communication stations a Request To Send (RTS) signal for requesting a transmission upon the start of the data transmission; and a plurality of second communication stations transmitting to other communication stations a Clear To Send (CTS) signal for notifying the completion of preparing the reception, wherein the first communication station transmits the RTS signal describing at least each of addresses the second communication stations that are desired to receive the data, and receives a plurality of CTS signals transmitted from each of the second communication stations in order to increase communication capacity.

4 Claims, 11 Drawing Sheets

| Frame Control | Duration | RA | TA | FCS | MANUM | RA2 | RA3 | RA4 | FCS2 |
|---|---|---|---|---|---|---|---|---|---|

F I G. 2
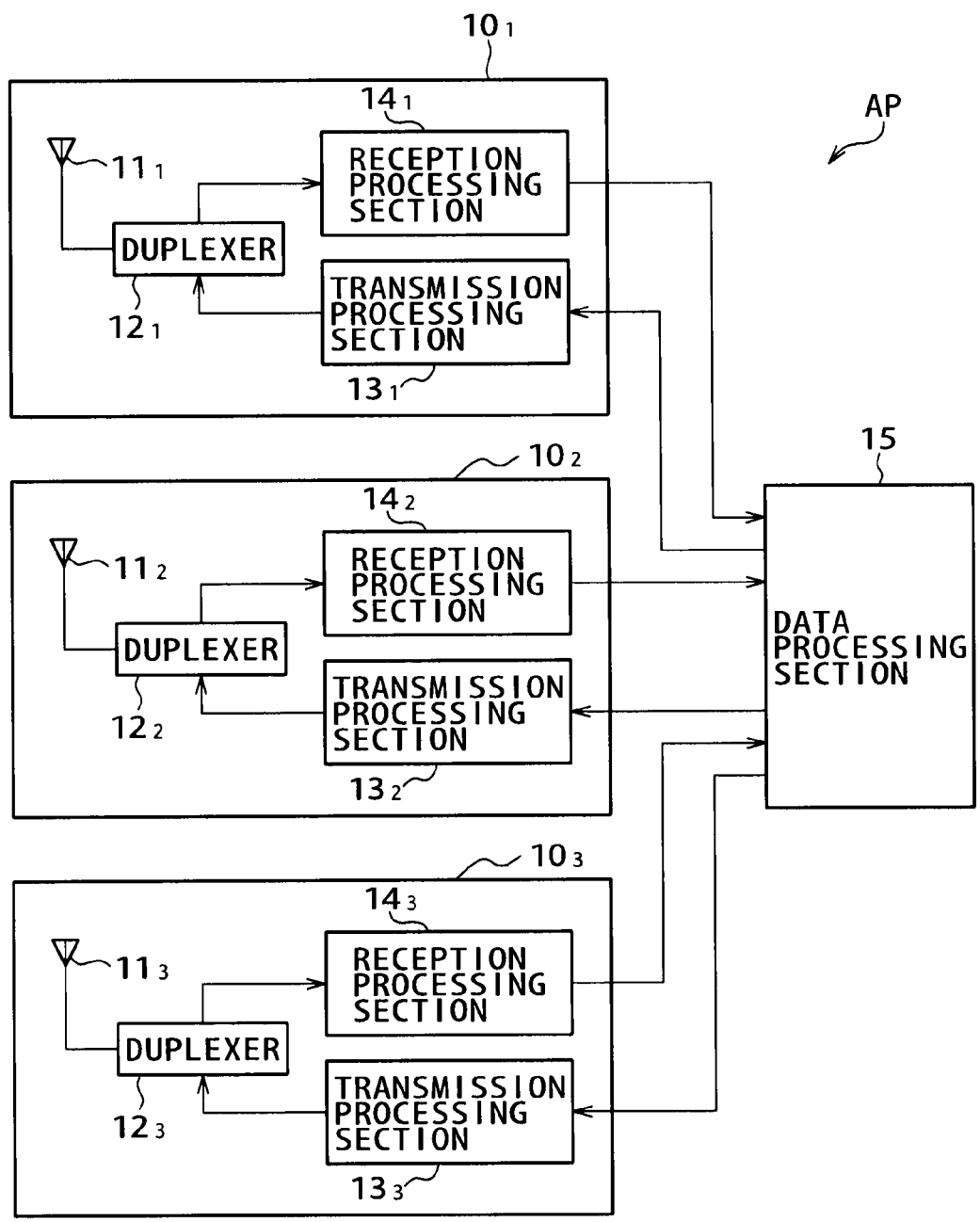

F I G. 3
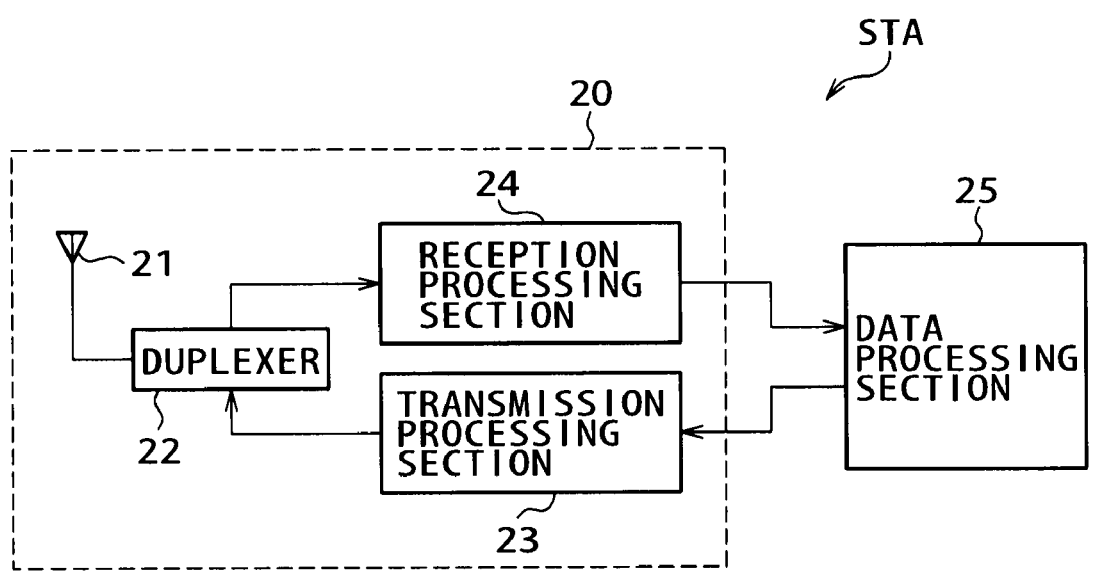

FIG. 4

| Frame Control | Duration | RA | TA | FCS |
|---|---|---|---|---|

FIG. 5

| Frame Control | Duration | RA | FCS |
|---|---|---|---|

COMMUNICATION SYSTEM, A COMMUNICATION METHOD, AND A COMMUNICATION APPARATUS WITH REQUEST TO SEND FEATURES

CROSS REFERENCE TO RELATED APPLICATION

This application is a continuation of, and claims the benefit of priority under 35 U.S.C. §120 from, U.S. Ser. No. 10/821,884, filed Apr. 12, 2004, and is based upon, and claims the benefit of priority under 35 U.S.C. §119 from, the Japanese Priority Document No. 2003-123280, filed on Apr. 28, 2003, the entire contents of each of which are incorporated herein by reference.

BACKGROUND OF THE INVENTION

1. Field of the Invention

This invention relates to a communication system and a communication method for carrying out data communications among a plurality of communication stations, and in a communication apparatus used in these communication system and communication method, this invention particularly relates to a communication system, a communication method, and a communication apparatus suitable for applying to wireless LAN (Local Area Network).

2. Description of the Related Art

Recently, for example, the near filed wireless communication techniques have been developed for wirelessly coupling various types of data processing terminals together, such as personal computers or portable data terminals, and their peripheral devices. Typically, the wireless LAN of the IEEE (Institute of Electrical and Electronics Engineers) 802.11 standard is now widely used.

In the wireless LAN according to the IEEE 802.11 standard, as techniques for the media access control (MAC) system regarding the protocol for distributed control, the centralized control or the like in data link layer, the contention free interval for the media access control by polling and the contention interval for the media access control by the carrier sensing method are standardized. Out of them, the contention period for the carrier sensing method is widely used.

More specifically, as the contention period, the CSMA/CA (Carrier Sense Multiple Access with Collision Avoidance) method following the autonomous distributed control method used in Ethernet (Trade mark) has been standardized. This CSMA/CA method is generally defined as a technique to avoid a collision of data from a communication station trying a data transmission with data being transmitted by another communication station, wherein the communication station confirms the used condition of the wireless channel by previously doing the carrier sensing method. In this case, if the band is not used, the communication station transmits the data, but if the band is used, the communication station postpones the transmission of the data until the band becomes an idle state. In the wireless LAN according to the IEEE 802.11 standard, an access point AP provided as a control station and also a plurality of stations STA existing within the radio wave accessible area of the access point communicate with each other by carrying out the procedures according to this CSMA/CA method.

As a technique regarding the CSMA/CA method, for example, Japanese Laid Open Patent application No. 2002-217914 discloses such a technique. That is, this patent document discloses a technique to improve the directivity gain of an antenna apparatus used in the CSMA/CA method to increase the communication quality.

In the media access control method according to the CSMA/CA method, there is an essentially unavoidable problem because this method assumes that a plurality of communication stations can detect wireless signals each other. That is, there is so-called hidden station problem. To solve this hidden station problem, the control using the so-called RTS (Request To Send) and CTS (Clear To Send) signals were developed in the wireless LAN according to IEEE 802.11 standard.

To explain the control with the RTS signal and the CTS signal, it is considered that an access point AP becomes a source, and tries to transmit data to a station STA. In this case, according to the wireless LAN of the IEEE 802.11, the access point AP that carries out the carrier sense in advance transmits the RTS signal as shown in FIG. 14, and after a predetermined interval SIFS (Short Inter Frame Space), the station STA that receives this RTS signal as a destination transmits the CTS signal as a response. The access point AP that receives the CTS signal starts transmission of data (Fragment) after the predetermined interval SIFS, and after the predetermined interval SIFS since the completion of the transmission of the data, the station STA that receives the data replies the so-called ACK (Acknowledgment) signal.

In this condition, other stations STA that do not communicate know that the channel is occupied for a predetermined interval in accordance with the exchanges of the RTS signal, the CTS signal, the data, and the ACK signal. Accordingly, they set the intervals as standby intervals in counter values NAV (RTS), NAV (CTS), NAV (Fragment), and NAV (ACK), which are called NAV (Network Allocation Vector), to record transmission operations or the like. In the wireless LAN according to the IEEE 802.11 standard, upon the elapse of this standby interval, the return of the ACK signal from the station STA as a destination to the access point AP also terminates. Further, in the wireless LAN according to the IEEE 802.11 standard, after a predetermined interval DIFS (Distributed Inter Frame Space) elapses from when the transmission of the ACK signal is terminated, decrements are started in the counters in which values are determined with uniform random numbers from zero to CW (Contention Window) for back off provided to avoid data collision, respectively. Then, one of stations STA and the access point AP of which counter value reaches zero first transmits the RTS signal to occupy the channel at the next interval.

As mentioned above, the wireless LAN according to the IEEE 802.11 standard is directed to solve the hidden station problem by avoiding data collisions in accordance with the notification of using the channel to other communication stations with the RTS/CTS control.

Here, the IEEE 802.11a standard is provided as one of standards for the physical layer operating in the MCA layer defined by the IEEE 802.11 standard. In the wireless LAN, the use of this physical layer provides wireless communications at a transmission rate of about 50 Mbps at its maximum. Actually, while the transmission rate decreases in the wireless LAN according to the propagation circumstance or the like, it is supposed that the transmission rate can be obtained around a half of the above mentioned maximum transmission rate.

However, for example, if it is assumed that a large capacity of data is transmitted as in the circumstance that this wireless LAN is established in a house, and a plurality of streams are transmitted to the television sets located at a plurality of rooms from a predetermined server, the above-described data transmission capacity may be insufficient. Thus, there is a demand for increasing a capacity of communication.

Adaptive array antennas include a plurality of antenna elements each having the same characteristic, are able to control amplitude and phase of oscillation in each antenna element independently, and provide communications with a plurality of stations on the same frequency at the same time. Further, the adaptive array antenna can reduce the possibility of interference among a plurality of radio waves. Because of this, the adaptive antenna array attracts attention as a technique providing an improvement in the frequency utilizing efficiency.

For example, Japanese Laid-open patent application Nos. 2002-51375 and 2001-339331 disclose the adaptive array antennas. The Japanese Laid-open patent application No. 2002-51375 discloses a technique providing an efficient downlink high speed packet transmission with the adaptive array antenna, and the Japanese Laid-open patent application No. 2001-339331 discloses a technique for communication with an optimum directivity.

SUMMARY OF THE INVENTION

However in the wireless LAN, two techniques, namely, the carrier sense according to the IEEE 802.11 standard and the Space Division Multiplexing with the adaptive array antenna, are difficult to combine.

In addition, in the wireless LAN, there is no protocol capable of the coexistence of an access point having the adaptive array antenna under the environment where there are stations operating according to the conventional protocol.

An aspect of the present invention is to provide a new frame format instead of the frame format for the conventional wireless LAN to provide a communication system, a communication method, and a communication apparatus capable of the space division multiplexed communication with the coexistence with stations operating in accordance with the conventional protocol.

Another aspect of the present invention is to provide a communication system for data communication among a plurality of communication stations, wherein the communication system comprises a first communication station transmitting to other communication stations a request to send signal for requesting a transmission upon the start of the data transmission, and a plurality of second communication stations transmitting to other communication stations a clear to send signal for notifying the completion of preparing the reception, wherein the first communication station transmits the request to send signal describing at least each of addresses of a plurality of the second communication stations that are desired to receive the data, and receives a plurality of clear to send signals transmitted from each of a plurality of the second communication stations.

In this communication system according to the present invention, the first communication station transmits the request to send signal describing at least addresses of a plurality of the second communication stations that are desired to receive the data, and receive a plurality of clear to send signals transmitted from each of a plurality of the second communication stations. Thus, the first communication station can transmit data to a plurality of communication stations at the same time with the coexistence with communication stations operating in accordance with the conventional protocol, so that a communication capacity of the network can be extremely increased.

Further, the first communication station may have a plurality of antenna elements for the adaptive array antenna operation. A plurality of the second communication stations may transmit clear to send signals describing at least the reference information known to the first communication station, respectively. The first communication station may learn weightings for the adaptive array antenna on the basis of the reference information in a plurality of the clear to send signals transmitted from a plurality of the second communication stations, respectively.

More specifically, the first communication station obtains transfer functions between each of antenna elements of a plurality of second communication stations and each of a plurality of antenna elements thereof on the basis of the reference information in a plurality of the clear to send signals transmitted from a plurality of the second communication stations, respectively, and learns the weightings for the adaptive array antenna on the basis of the transfer functions.

This structure provides the communication by the space division multiplexing between the first communication station having the adaptive array antenna and each of a plurality of the second communication stations with the coexistence with communication stations operating in accordance with the conventional protocol.

Further, when receiving the clear to send signals transmitted from each of a plurality of the second stations, the first communication station respectively transmits data by the space division multiplexing to a plurality of the second communication stations. Further, when receiving the data transmitted from the first communication station, each of a plurality of the second communication stations transmits to other communication stations a response signal which is used to notify that the transmitted data is correctly received and describes at least second reference information inherent to the second communication station known to the first communication station.

Further, the first communication station directly learns the weightings for the adaptive array antenna on the basis of the second reference information in a plurality of response signals respectively transmitted from a plurality of the second communication station. According to this operation, the communication system can learn weightings for the adaptive array antenna which adaptively follows the circumference change by the first communication station with the adaptive array antenna. In this operation, the first communication station directly learns the weightings for the adaptive array antenna with a predetermined adaptive algorithm. As the adaptive algorithm, the RLS algorithm may be used.

Further, a plurality of the second communication stations may transmit the clear to send signals describing their address, respectively. Thus, though the first communication station receives a plurality of clear to send signals, the first communication can know the station which transmits the received clear to send signal.

There may be transmission modes of the clear to send signal from a plurality of the second communication station as follows. As a first mode, it is thought that each of the second communication stations may time-divisionally transmit clear to send signals. In this mode, in the communication system according to the present invention, with the coexistence with communication stations operating according to the conventional protocol, the space division multiplexing can be provided in the adaptive array antenna by addition of a new format only for the MAC layer portion without change in the physical layer. As a result, this system can be provided at a low cost because of the extremely simple structure.

As a second mode, the clear to send signal may be formed to have generally two sections. The first section may describe at least an interval where a third communication station the address of which is not described in the request to send signal transmitted from the first communication station must stop its communication operation. The second section may describe at least reference information known to the first communication station. According to this structure, in the communication system, after receiving the request to send signal, respective communication stations can simultaneously receive the first section in the clear to send signal, so that an erroneous start of the communication caused by a difference in the completion timing between the received clear to send signals can be avoided.

As a third mode, the clear to send signal may be formed to have generally two sections. The first section may describe at least an interval where a third communication station the address of which is not described in the request to send signal transmitted from the first communication station must stop its communication operation. The second section may describe at least reference information known to the first communication station. It is thought that a plurality of the second communication stations may transmit the second sections at the same time after transmission of the first sections at the same time. In the communication system according to the present invention, this structure reduces an occupation interval of the clear to send signal, so that the overhead can be eliminated.

Further, each of the first communication station and a plurality of the second communication stations is configured to carry out wireless communications, and the communication system according to the present invention is suitable for applying to wireless LAN systems.

A further aspect according to the present invention provides a communication method among a plurality of communication stations, wherein upon a data transmission, a first communication station transmits a request to send signal for requesting transmission to other station, the request to send signal describing at least addresses of a plurality of second communication stations that are desired to receive the data. When receiving a request to send signal transmitted from the first communication station, each of a plurality of the second communication stations transmits a clear to send signal notifying the completion of preparing the reception to other communications.

In this communication method, the first communication station may transmit to other stations a request to send signal describing at least addresses of a plurality of second communication stations that are desired to receive the data and receive a plurality of clear to send signals respectively transmitted from a plurality of second communication stations. Thus, it is possible to transmit data to a plurality of the communication stations at the same time with the consistence with the communication stations operating in accordance with the conventional protocol, so that a communication capacity of the network can be extremely increased.

A still further aspect according to the present invention provides a communication apparatus for transmitting data to other communication stations, wherein the communication apparatus comprises data processing means for generating a request to send signal requesting transmission to other communication station upon data transmission and describing at least addresses of a plurality of communication stations requested to receive the data, and communication means for transmitting the request to send signal.

In this communication apparatus, the request to send signal describing addresses of a plurality of communication stations that are desired to receive data is transmitted, so that with the coexistence with the communication stations operating according to the conventional protocol, the data can be transmitted to a plurality of communication stations at the same time. Thus, the use of the communication apparatus as a communication station for transmitting data provides a network of an extremely increased communication capacity.

Further, the communication apparatus is provided for transmitting data to other communication stations, wherein the communication apparatus comprises data processing means for generating a request to send signal requesting transmission to other communication stations upon data transmission and describing at least addresses of a plurality of communication stations that are desired to receive data and, data processing means for transmitting the clear to send signal for notifying the completion of preparing the reception to the communication station of the transmission source.

The communication apparatus of the present invention receives the request to send signal describing addresses of a plurality of communication station requested to receive the data and generates a clear to send signal in accordance with this, so that the data can be transmitted to a plurality of communication stations at the same time with the coexistence with communication stations operating according to the conventional protocol. Thus, the use of the communication apparatus for receiving data makes it possible to provide a setting up of a network having an extremely increased communication capacity.

A further aspect according to the present invention provides a communication system in which new frame formats for the RTS (Request To Send) signal, the CTS (Clear To Send) signal and the ACK (Acknowledge) signal are proposed, and the access point transmits the RTS signal describing at least addresses of a plurality of stations requested to receive data and receives a plurality of CTS signals transmitted from a plurality of stations, so that the space division multiplexing communication can be provided between the access point with the adaptive array antenna and a plurality of stations with the coexistent with the station operating according to the conventional protocol.

BRIEF DESCRIPTION OF THE DRAWINGS

The object and features of the present invention will become more readily apparent from the following detailed description taken in conjunction with the accompanying drawings and the same or corresponding elements or parts are designated with like references throughout the drawings in which:

FIG. 2 is a block diagram of an access point in the communication system shown in FIG. 1;

FIG. 3 is a block diagram of each station in the communication system shown in FIG. 1;

FIG. 4 is an illustration of a format for an RTS signal according to related art;

FIG. 5 is an illustration of a format for a CTS signal according to related art;

DETAILED DESCRIPTION OF THE PREFERRED EMBODIMENTS

Hereinafter, preferred embodiments according to the present invention will be described with reference to the attached drawings.

This embodiment provides a communication system preferable in the application to a wireless LAN according to the IEEE (Institute of Electrical and Electronics Engineers) 802.11 standard. Particularly, this communication system provides a space division multiplexing communication between an access point AP having an adaptive array antenna and a plurality of stations with the coexistence with stations operating according to the conventional protocol. This is provided by new frame formats for a request to send signal (RTS) for requesting transmission to other communication stations from a communication station to start the data transmission, the clear to send signal (CTS) for notifying the completion of preparing the reception to other communication stations from the communication station requested to receive the data, and the acknowledgement signal (ACK) for notifying from the communication station receiving the data to other communication stations that the transmitted data has been correctly received.

First, a first embodiment is described. In a communication system according to the first embodiment, a plurality of stations receiving the RTS signal transmitted from the access point time-divisionally return CTS signals, respectively. Further, in this communication system, while forming the directivity through learning the weightings for the equipped adaptive array antenna, the access point obtains the transfer functions between each of the antenna elements of stations and its own adaptive array antenna on the basis of the time-divided CTS signals and then, obtains the weightings for the adaptive array antenna at the first learning. At and after the second learning, the access point directly obtains the weightings for the adaptive array antenna on the basis of a plurality of the ACK signals which are space division multiplexed.

Figure 1:
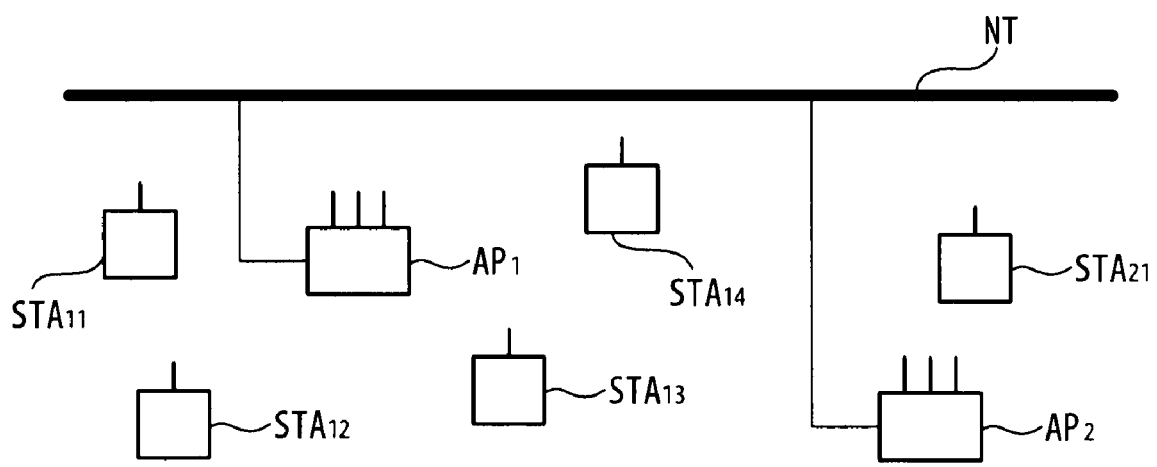
FIG. 1 is a block diagram of a communication system according to one embodiment of the present invention.

In this communication system, for example as shown in FIG. 1, a network is set up by forming between at least one or more than one access points, that is, the access points $AP_1$ and $AP_2$ coupled to a predetermined wired network cable NT, such as Ethernet (Trade mark), and a plurality of stations $STA_{11}$, $STA_{12}$, $STA_{13}$, $STA_{14}$, and $STA_{21}$. Each of the stations $STA_{11}$, $STA_{12}$, $STA_{13}$, $STA_{14}$, and $STA_{21}$ determines one access point to which each of them belongs in accordance with the IEEE 802.11 standard, and thus they belong to one access point. In this example, each of the stations $STA_{11}$, $STA_{12}$, $STA_{13}$, and $STA_{14}$ belongs to the access point $AP_1$, and the station $STA_{21}$ belongs to the access point $AP_2$. Each of the access points $AP_1$ and $AP_2$ includes, a plurality of antenna elements $10_1$, $10_2$, $10_3$, - - - as communication means and a data processing section 15 coupled to these antenna elements $10_1$, $10_2$, $10_3$, - - - as a data processing means as shown in FIG. 2, and is configured to be able to carry out processing for an array antenna.

In each of the antenna elements $10_1$, $10_2$, $10_3$, - - - , an antenna 11 is coupled to a transmission processing section 13 and a reception processing section 14 through a duplexer 12. The transmission processing section 13 effects various processes including an A/D conversion, a modulation, or the like to the base band signal supplied from the data processing section 15 and further converts it into, for example, an RF (Radio Frequency) signal and then, supplies the RF signal to the duplexer 12. In this case, as the physical layer operating in the MAC (Media Access Control) defined by the IEEE 802.11 standard, a physical layer according to the IEEE 802.11a standard is adopted. According to this, as the modulation method, the so-called Orthogonal Frequency Division Multiplexing (OFDM) modulation method is adopted. On the other hand, the reception processing section 14 converts the received signal into an RF signal and supplies a base band signal provided through various processes such as D/A conversion or demodulation to the data processing section 15.

The data processing section 15 executes processes at respective layers in the media access control method provided in this communication system, such as generating, for example, the RTS signal describing various information mentioned later. In this operation, the data processing section 15 forms a directivity pattern through learning of the weightings for the adaptive array antenna on the basis of the reception signals respectively supplied from a plurality of antenna elements $10_1$, $10_2$, $10_3$, - - - to function the antenna elements $10_1$, $10_2$, $10_3$, - - - as an adaptive array antenna. In addition, the data processing section 15 weights the data to be transmitted through each of a plurality of antenna elements $10_1$, $10_2$, $10_3$, - - - on the basis of the same weighting pattern as that for reception.

On the other hand, each of the stations $STA_{11}$, $STA_{13}$, $STA_{14}$, and $STA_{21}$ includes, as shown in FIG. 3, only one antenna element 20 and a data processing section 25 as a data processing means coupled to this antenna element. The antenna element 20 is constructed similarly to each of the above-described antenna elements $10_1$, $10_2$, $10_3$, - - - , wherein the antenna 21 is coupled to a transmission processing section 23 and to a reception processing section 24 through a duplexer 22. Further, the data processing section 25 executes processes at respective layers in the media access control method equipped in this communication system such as generating the CTS signal or the ACK signal describing various types of information mentioned later.

In this communication system, new Frame formats for the RTS signal, the CTS signal, and the ACK signal are proposed as follows. First, for comparison, the conventional RTS signal, CTS signal, and ACK signal will be described.

FIG. 4 shows the format of the conventional RTS signal. The conventional RTS signal includes a Frame Control formed of two octets, a Duration formed of two octets, and a Receiver Address RA and a Transmitter Address TA respectively formed of six octets, and a Frame Check Sequence FCS formed of four octets.

The Frame Control has a subdivided format to represent various types of information, such as a type of the packet, a version of the protocol, the presence or the absence of re-transmission, the route information of the data. The Frame Control is included in the CTS signal, the ACK signal, and general data frames in addition to the RTS signal and is commonly used among all frames.

The Duration is provided to specify a time interval. The communication stations including the access point and respective stations can know the time interval where the communication operation is inhibited on the basis of the time interval described in the Duration when its address is not described at the Receiver Address RA. More specifically, a counter value called NAV (Network Allocation Vector), namely, a NAV counter value, is set in the Duration. The Duration is commonly used among the CTS signal, the ACK signal, and general data frames in addition to the RTS signal.

The Receiver Address RA represents the address of a communication station that are desired to receive the data. The Transmitter Address TA represents the address of the communication station which transmits the data.

The Frame Check Sequence FCS describes 32 bits of CRC (Cyclic Redundancy Check) data. The communication station which receives the data calculates the Frame Check Sequence. Upon disagreement of the calculation result with the transmitted Frame Check Sequence, this communication station scraps the frame as a destroyed frame, and receives only correct MAC packets to execute processing them.

FIG. 5 illustrates formats of the conventional CTS signal and the ACK signal. The conventional CTS signal and ACK signal have the same format. That is, the conventional CTS signal and ACK signal each include two octets of Frame Control, two octets of Duration, six octets of Receiver Address, and four octets of Frame Check Sequence FCS. Here, these elements in the format are the same as those in the RTS signal in meaning. Among them, the Receiver Address is data obtained by copying the Transmitter Address value described in the RTS signal received by each station. Difference between the CTS signal or the ACK signal and the RTS signal is the absence of the Transmitter Address.

The formats of the conventional RTS signal, CTS signal, and ACK signal are as mentioned above. Here, inconvenient matters are studied if these conventional RTS signal, CTS signal and ACK signal would be applied to an adaptive array antenna.

First, in the wireless LAN according to the IEEE 802.11 standard, data is received generally by one communication station. Thus, in the conventional RTS signal, only an address of one communication address is described in the Receiver Address. However, if it is assumed that the adaptive array antenna is adopted, because there is necessity to call a plurality of stations from an access point with the RTS signal, it is inconvenient if only one Receiver Address is provided.

Further, when the adaptive array antenna is adopted, it is necessary to know the station which transmits the CTS signal and the ACK signal because the weightings for the adaptive array antenna should be learned with a plurality of CTS signals and a plurality of ACK signals.

Figure 6:
FIG. 6 is an illustration of a format for an RTS signal according to a first embodiment of the present invention.
Figure 7:
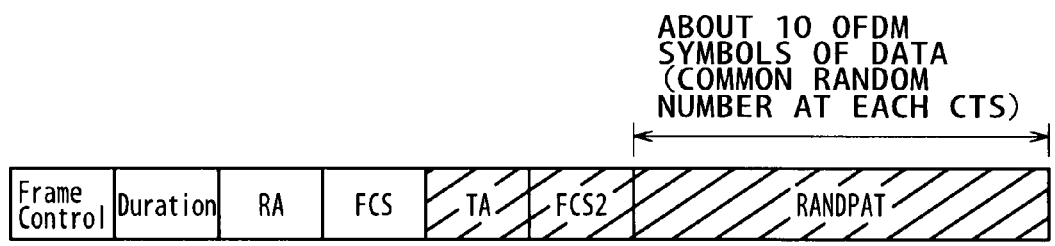
FIG. 7 is an illustration of a format for a CTS signal according to the first embodiment of the present invention.
Figure 8:
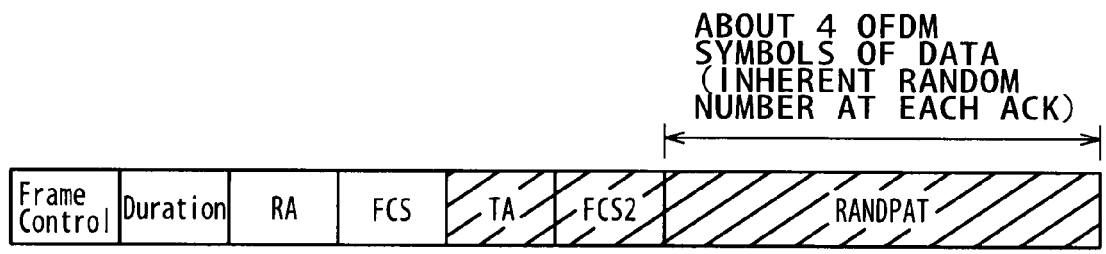
FIG. 8 is an illustration of a format for an ACK signal according to the first embodiment of the present invention.

Then, in order to remove the inconvenient matters with the conventional RTS signal, CTS signal, and ACK signal, in the preset invention, new formats are proposed for the RTS signal, the CTS signal, and ACK signal as shown in FIGS. 6 to 8. More specifically, the new RTS signal includes, as shown in FIG. 6, a new part hatched in the drawing in addition to two octets of Frame Control, two octets of Duration, six octets of a Receiver Address and a Transmitter Address, and four octets of a Frame Check Sequence.

The format of the new part includes a MANUM, a plurality of Receiver Addresses (RA2, RA3, RA4, - - - ) and a Frame Check Sequence (FCS2). The MANUM represents the number of stations operating in the space division multiplexing with the adaptive array antenna. Preferably, the number described in the MANUM is generally around four.

The number described in the MANUM minus one are provided for the Receiver Addresses (RA2, RA3, RA4, - - - ) in the format. That is, when the adaptive array antenna is adopted, it is necessary to specify a plurality of the destinations to request responses with the CTS signals to a plurality of stations operating in the space division multiplexing, so that a plurality of the Receiver Addresses should be provided at the number of stations operating in the space division multiplexing. For example, in the case of the format shown in FIG. 6, it is possible to specify four stations for the space division multiplexing.

The Frame Check Sequence FCS2 is CRC check data for the added format portions.

As mentioned above, the new proposed RTS signal includes the conventional format at the former half part and new data elements are added at the latter half part. This format is made to provide the coexistence with the conventional station that can interpret only conventional RTS signal.

That is, if the conventional station that can interpret only conventional RTS signal receives the RTS signal shown in FIG. 6, after execution of the CRC checking on the basis of the Frame Check Sequence FCS at the former half part, the conventional station sets a counter value for NAV on the basis of the Duration to stop communication operation for this time interval. In this case, the conventional type of station is not specified at the Receiver Addresses (RA2, RA3, RA4, - - - ) at the latter half part of the newly added portion. That is, because the access point corresponding to the new format executes the space division multiplexing toward only the stations corresponding to the new format portion, the address of the conventional type of station is not described at the Receiver Addresses (RA2, RA3, RA4, - - - ) at the latter half part in the format. Thus, when receiving the new type of RTS signal, the conventional type of station always operates as other station that is not a destination and disregards the latter half part having any format, but stops communication operations with setting the counter value for NAV on the basis of the Duration at the former half format part. This structure provides the coexistence with the conventional type of station without problems because the conventional type of the station only executes the same process as the conventional system using only the former half part of the RTS signal.

Next, the proposed new CTS signal includes, as shown in FIG. 7, a new part hatched in the drawing is added to two octets of Frame Control, two octets of Duration, six octets of a Receiver Address, and four octets of a Frame Check Sequence. More specifically, the CTS signal includes, at the newly added format portion, a Transmitter Address TA, a Frame Check Sequence FCS2, and an RANDPAT. The Transmitter Address TA describes the address of the communication station transmitting the CTS signal. The Frame Check Sequence FCS2 is CRC check data for the newly added Transmitter Address.

The RANDPAT represents reference information known to the communication station that transmits the RTS signal and is a random sequence used for obtaining the transfer functions for the adaptive array antenna by the communication station receiving the CTS signal, that is, the communication station transmitted the RTS signal. The RANDPAT includes about ten OFDM symbols of information. Thus, if four CTS signals are returned, it takes at least an interval of forty OFDM symbols. Further, because the RANDPAT is used only for obtaining the transfer functions, it may be a random sequence common to all CTS signals. Here, this RANDPAT is not subjected to parity checking. This is because though the RANDPAT is defined in the MAC layer, it is used in the physical layer.

As mentioned above, the new CTS signal, like the RTS signal, includes the conventional format at the former half part and new data elements are added at the latter half part. This format is made to provide the coexistence with the conventional type of station that can interpret only the conventional RTS signal as mentioned above.

Next, the new ACK signal includes, as shown in FIG. 8, a new part hatched in the drawing in addition to two octets of a Frame Control, two octets of a Duration, six octets of a Receiver Address, and four octets of a Frame Check Sequence. More specifically, the ACK signal includes, at the newly added format portion, a Transmitter Address TA, a Frame Check Sequence FCS2, and an RANDPAT. That is, the ACK signal is formed similarly to the CTS signal basically, but there is a difference at the RANDPAT.

More specifically, at the RANDPAT in the ACK signal, different inherent random sequences are described for stations specified at the Receiver Addresses (RA, RA2, RA3, RA4, - - - ) in the RTS signals, respectively, such that the RAND 1 sequence is described at the RANDPAT for the station specified at the Receiver Address RA in the RTS signal, and the RAND 2 sequence is described at the RANDPAT for the station specified at the Receiver Address RA2. Further, this RANDPAT is different from the RANDPAT in the CTS signal in the length of a random sequence. More specifically, because the learning of the weightings for the adaptive array antenna with the ACK signal is rather directed to adaptively tracking changes in circumstances, the RANDPAT in the ACK signal is allowed to have a shorter random sequence length than the RANDPAT in the CTS signal, so that about four OFDM symbols of random sequence data is sufficient in length. The ACK signal is transmitted and received between a plurality of pieces of data (Fragments) and thus, the ACK signal is transmitted and received frequently. Thus, it is difficult to learn the weightings for the adaptive array antenna with a lengthy random sequence as in the CTS signal and a lengthy random sequence is unnecessary because it is provided only for adaptively tracking the change in circumstances.

This communication system, using the RTS signal, the CTS signal, and the ACK signal having the frame formats as mentioned above, executes communication in accordance with the following protocol. Here, for convenience of explanation, it is assumed that out of four stations $STA_{11}$, $STA_{12}$, $STA_{13}$, and $STA_{14}$, the station $STA_{14}$ is the conventional type of station that cannot deal with the new format, other three stations $STA_{11}$, $STA_{12}$, and $STA_{13}$ operate in the space division multiplexing as second communication stations, and the access point $AP_1$ operates as the first communication station trying to transmit and receives data.

Figure 9:
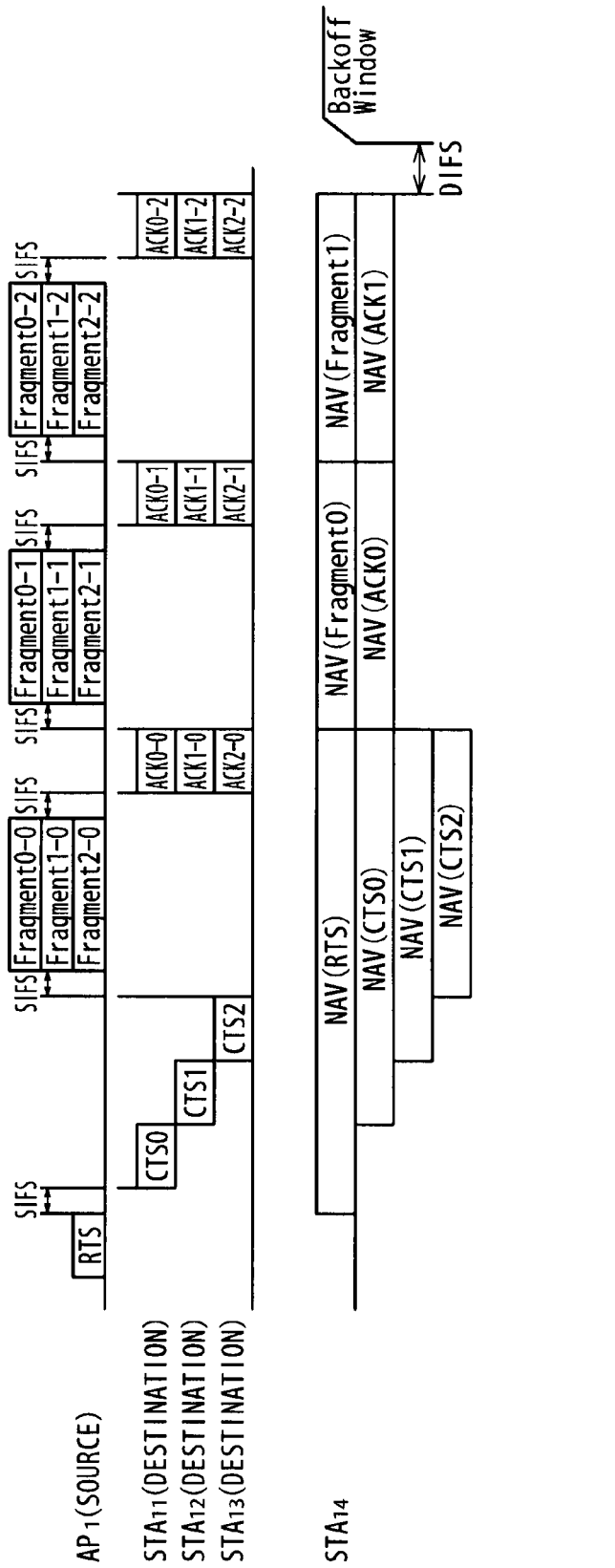
FIG. 9 is a time chart illustrating a protocol according to the first embodiment.

In this communication system, as shown in FIG. 9, the access point $AP_1$ senses the carrier in advance and transmits the RTS signal upon confirming that other stations or other access points are during non-communication. At this stage, the adaptive array antenna is non-directional because the weightings are not learned and thus, the RTS signal is transmitted with a given antenna though there are a plurality of antenna elements $10_1$, $10_2$, and $10_3$. The RTS signal has the format as mentioned above and shown in FIG. 6, in which the addresses of stations $STA_{11}$, $STA_{12}$, and $STA_{13}$ are written as the candidates for the space division multiplexing at the three Receiver Addresses RA, RA2, and RA3, respectively.

On the other hand, in response to the RTS signal transmitted from the access point $AP_1$, the conventional type station $STA_{14}$ sets the value in the Duration in the RTS signal to the NAV counter value NAV (RTS) as a standby interval to stop communication operations.

After this, in the communication system, the stations $STA_{11}$, $STA_{12}$, and $STA_{13}$ receiving the RTS signal as destinations time-divisionally return CTS signals CTS0, CTS1, and CTS2 to avoid overlap in time base. In this operation, the station $STA_{11}$ requested to first return the CTS signal returns the CTS signal CTS0 after a predetermined interval SIFS (Short Inter Frame Space) elapsed upon receiving the RTS signal. The order of returning a plurality of the CTS signals depends on the order of the Receiver Addresses in the RTS signal. More specifically, in this communication system, the station $STA_{11}$, described at the Receiver Address RA in the RTS signal, returns the CTS signal at first. The station $STA_{12}$, described at the Receiver Address RA2 in the RTS signal, returns the CTS signal at second. The station $STA_{13}$, described at the Receiver Address RA3 in the RTS signal, returns the CTS signal at third.

Here, in this communication system, because the space division multiplexing is not executed at this stage, this operation does not affect the processes defined in the physical layer such as synchronization or obtaining the modulation method with the preamble in the physical layer. Each of the CTS signals has the format shown in FIG. 7, wherein addresses of the source stations $STA_{11}$, $STA_{12}$, and $STA_{13}$ are described at the Transmitter Address of the CTS signals, respectively, so that the access point $AP_1$ can know the station which transmits each of the received CTS signals. Then, the access point $AP_1$ obtains the transfer functions between each of antenna elements 20 equipped in the stations $STA_{11}$, $STA_{12}$, and $STA_{13}$ and each of a plurality of antenna elements $10_1$, $10_2$, and $10_3$ on the basis of a plurality of CTS signals received and thus, can synthesize the weightings on the obtained transfer functions. Further, the access point $AP_1$ can instantaneously judges combinations capable of the space division multiplexing by obtaining the transfer functions on the basis of a plurality of CTS signals.

On the other hand, in response to the CTS signals transmitted from the respective stations $STA_{11}$, $STA_{12}$, and $STA_{13}$, the conventional type station $STA_{14}$ sets the value in the Duration in the CTS signal to the NAV counter values NAV (CTSO), NAV (CTS1), and NAV (CTS2) as standby intervals to stop communication operations. Further, it is necessary to describe at the Duration in respective CTS signals such values that the counter values expire at the same time.

The access point $AP_1$ functions as an adaptive array antenna by learning the weightings for the adaptive array antenna. That is, when a predetermined interval SIFS elapsed after reception of the last CTS signal (CTS2), the access point $AP_1$ starts transmission of data including Fragment 0-0, Fragment 1-0, and Fragment 2-0 by the space division multiplexing to respective stations $STA_{11}$, $STA_{12}$, and $STA_{13}$ with a plurality of antenna elements $10_1$, $10_2$, and $10_3$.

In response to this, respective stations $STA_{11}$, $STA_{12}$, and $STA_{13}$ return respective ACK signals ACK 0-0, ACK 1-0, ACK 2-0 at the same time when a predetermined interval SIFS elapsed after the completion of the data transmission from the access point $AP_1$. The ACK signal has the format as earlier shown in FIG. 8 in which the addresses of stations $STA_{11}$, $STA_{12}$, and $STA_{13}$ are described as transmission sources at the Transmitter Address TA, so that the access point $AP_1$ can know the station which transmits the received ACK signal.

Then, the access point $AP_1$ directly learns the weightings for the adaptive array antenna with a predetermined adaptive algorithm such as the so-called RLS (Recursive Least Square) on the basis of the RANDPAT in a plurality of the received ACK signals.

On the other hand, in response to the transmission of data from the access point $AP_1$, the conventional type station $STA_{14}$ sets the time interval described at the Duration in the data to the NAV counter value NAV (Fragment 0) as a standby interval to stop communication operations. Further, in response to the transmission of the ACK signals from respective stations $STA_{11}$, $STA_{12}$, and $STA_{13}$, the conventional type station $STA_1$, sets the time intervals described at the Duration of the ACK signals to the NAV counter value NAV (ACK 0) to stop communication operations.

In this communication system, according to the protocol mentioned above, the communication is carried out with the newly proposed RTS signal, CTS signal, and ACK signal to provide the space division multiplexing with the adoptive array antenna.

There are mainly two reasons for time-divisionally returning the CTS signals. The first reason is that it is easy to know the station which is an obstacle to the space division multiplexing. That is, if it is assumed that a plurality of CTS signals are instantaneously received and the weightings are learned for the adaptive array antenna, it is necessary to assign inherent random sequences to the CTS signals, respectively. Further, as a result of the learning, if the Signal-to-Interference-plus Noise Ratio (SINR) is insufficient, it would be difficult to clearly judge the station which should be deleted from the candidates of the space division multiplexing. On the other hand, in the method in which the CTS signals are time-divisionally returned, it is sufficient to assign the common random sequence to respective CTS signals. Further if the SINR is insufficient, it is possible to easily judge the station which should be deleted from the candidates of the space division multiplexing.

The second reason is that if a plurality of CTS signals are transmitted at the same time at the initial stage, there is a possibility that synchronization and demodulation of various data at the preamble in the physical layer become difficult. That is, there is a possibility that it becomes difficult to read the information of the modulation method or the like described at the header in the physical layer becomes difficult. More specifically, if it is assumed that the CTS signals are received at the same time from the initial stage, and the weightings for the adaptive array antenna are directly learned with a predetermined adaptive algorithm such as the RSL algorithm, there are many problems in synchronizing, the format in the physical layer (modification of the format is required), or the like. On the other hand, in the method of returning the CTS signals time-divisionally, no change is necessary for the physical layer, so that various types of information at the physical layer can be obtained in the same processing as the conventional method.

As mentioned above, in the communication system, the change is limited to returning the CTS signals time-divisionally, and to acquire the transfer functions on the basis of the CTS signals. Thus, troubles in the actual use of apparatuses can be reduced, and there is no change in the physical layer, so that a simple system structure can be provided.

As mentioned above, in the communication system according to the first embodiment of the present invention, a plurality of stations $STA_{11}$, $STA_{12}$, and $STA_{13}$, that receive the RTS signal transmitted from the access point $AP_1$ time-divisionally return the CTS signals, and the access point $AP_1$ learns the weightings for the equipped adaptive array antenna to form the directivity. During this, at the first learning, the weightings for the adaptive array antenna are obtained by acquiring the transfer functions on the basis of the RANDPAT in a plurality of the time-divided CTS signals. At or after the second learning, the weightings for the adaptive array antenna is directly obtained on the basis of the RANDPAT in a plurality of ACK signals which are space division multiplexed. Thus, while the coexistence with the station operating according to the conventional protocol is possible, the space division multiplexing in the downlink transmission from the access point $AP_1$ to the stations $STA_{11}$, $STA_{12}$, and $STA_{13}$ can be provided so that the communication capacity of the network can be extremely increased.

Further, in this communication system, though the coexistence with the station operating according to the conventional protocol is possible, the space division multiplexing is provided with the adaptive array antenna only by adding a new format only in the MAC layer without modification in the physical layer. Thus, because the structure is made extremely simple, this system can be provided at a low cost.

Now, a second embodiment is described. In the communication system according to the second embodiment, the CTS signal of the first embodiment with the format shown in FIG. 1 is divided into a former half part (first half part) and a latter half part (second half part). A plurality of the stations receiving the RTS signal transmitted from the access point $AP_1$ return the former half part at the same time and time-divisionally return the latter half part. Here, the communication system according to the second embodiment is provided in the same network in structure as that shown in FIG. 1, and the access points and stations have the same structures as those shown in FIGS. 2 and 3, respectively. Thus, the corresponding parts to the first embodiment are designated with the same references and thus, the detailed descriptions are omitted.

First, prior to describing the communication system according to the second embodiment, the progress leading to develop this communication system will be described. The CTS signal with the format according to the first embodiment shown in FIG. 7 can be generally divided into the former half part having the same structure as the conventional CTS signal representing at least the Duration and the latter half part added to acquire mainly the transmission functions of the adaptive array antenna.

In this case, the station that does not execute the space division multiplexing can know the interval to stop communication operations. However, these communication stations may start the communication operation with presumption that there is a vacant channel because it takes a long time from the reception of the RTS signal if the station can receive only the last or latter CTS signal such as the CTS signal CTS2 shown in FIG. 9 because the CTS signals are time-divisionally returned. That is, these stations stop the communication operation with setting the NAV counter value NAV (RTS) in response to the reception of the RTS signal. However, if it takes long time to receive the CTS signal, the set NAV counter value NAV (RTS) becomes zero, so that the communication operation may be started without setting NAV counter value NAV (CTS) for the CTS signal.

Then, in the communication system according to the second embodiment, a new format is proposed in which the CTS signal is divided into the former half part and the latter half part, and the former half parts each describing at least the Duration are returned at the same time and the latter half parts each describing at least the RANDPAT are time-divisionally returned to solve such a problem. Specifically, the frame formats for the RTS signal and the CTS signals used in this communication system are proposed as shown in FIGS. 10A, 10B, 11A, and 11B.

Figure 10A:
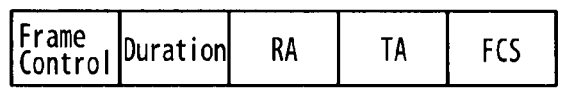
FIG. 10A is an illustration of a former half part of the format for the RTS signal according to a second embodiment of the present invention.
Figure 10B:
FIG. 10B is an illustration of a latter half part of the format for the RTS signal according to the second embodiment of the present invention.

The newly proposed RTS signal, as shown in FIGS. 10A and 10B, is generally divided into a former half part having the same structure as the conventional RTS signal and the newly added latter half part. More specifically, the former half part of the RTS signal includes, as shown in FIG. 10A, two octets of a Frame Control, two octets of a Duration, six octets of a Receiver Address RA and a Transmitter Address TA, and four octets of a Frame Check Sequence FCS. The latter half part of the RTS signal includes, as shown in FIG. 10B, the MANUM, and a plurality of the Receiver Address RA2, RA3, RA4, - - - , and the Frame Check Sequence FCS2. Here, these elements in the format are the same as those described above in meaning. Hereinafter, the former half part shown in FIG. 10A is referred to as an RTS 802.11 signal and the latter part is referred to as an RTSadd signal. These RTS 802.11 signal and the RTSadd signal are transmitted in separate physical packets, respectively.

Figure 11A:
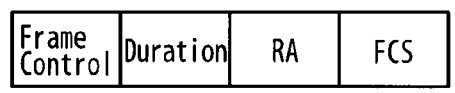
FIG. 11A is an illustration of a former half part of the format for the CTS signal according to the second embodiment of the present invention.
Figure 11B:
FIG. 11B is an illustration of a latter half part of the format for the CTS signal according to the second embodiment of the present invention.

Further, as shown in FIG. 11A, the newly proposed CTS signal is generally divided into a former half part with the same structure as the conventional CTS signal and a newly added latter half part. More specifically, the former half part of the CTS signal includes, as shown in FIG. 11A, two octets of the Frame Control, two octets of the Duration, six octets of the Receiver Address RA, and four octets of the Frame Check Sequence FCS. The latter half part of the CTS signal includes, as shown in FIG. 11B, a Transmitter Address TA, a Frame Check Sequence FCS2, and a RANDPAT. Here, these elements in the format are the same as those described above in meaning. Hereinafter, the former half part shown in FIG. 11A is referred to as a CTS 802.11 signal and the latter half part is referred to as a CTSadd signal. These CTS 802.11 signal and the CTSadd signal are transmitted in individual physical packets, respectively. Here, the ACK signal has the same structure as that shown in FIG. 8.

This communication system, using the RTS signal, the CTS signal and the ACK signal having the frame formats as mentioned above, executes the communication in accordance with the following protocol. For convenience of explanation, it is also assumed that out of four stations $STA_{11}$, $STA_{12}$, $STA_{13}$, and $STA_{14}$, the station $STA_{14}$ is the conventional type of station that cannot deal with the new format, the other three stations $STA_{11}$, $STA_{12}$, and $STA_{13}$ operate in the space division multiplexing as second communication stations, and the access point $AP_1$ operates as the first communication station trying to transmit and receive the data.

Figure 12:
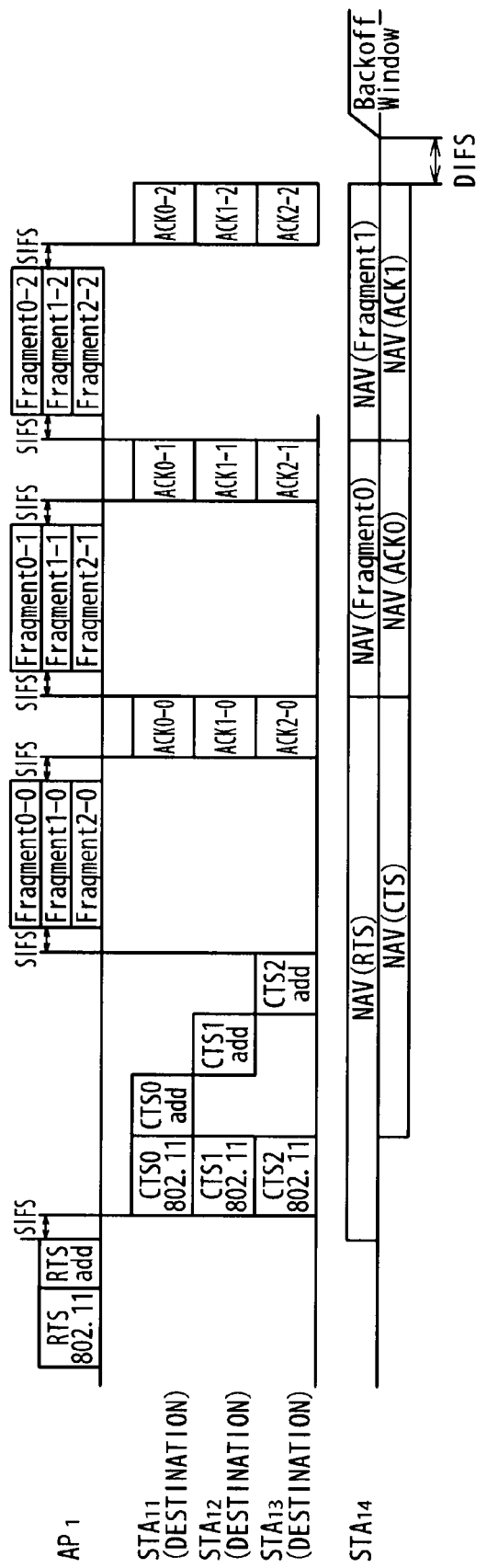
FIG. 12 is a time chart illustrating the protocol according to the second embodiment.

In this communication system, as shown in FIG. 12, the access point $AP_1$ senses the carrier in advance and transmits the RTS signal upon confirming that other station or other access points are not communicating. After this, the RTS 802.11 signal and the RTSadd signals are transmitted in individual physical packets. Here, as mentioned earlier, at this stage, the adaptive array antenna is non-directional because the weightings are not learned. The RTS signal has the format as mentioned above and shown in FIGS. 10A and 10B, in which addresses of stations $STA_{11}$, $STA_{12}$, $STA_{13}$ are written as the candidates for the space division multiplexing at the three Receiver Addresses RA, RA2, and RA3, respectively.

On the other hand, in response to the RTS 802.11 signal and the RTSadd signal transmitted from the access point $AP_1$, the conventional type of the station $STA_{14}$ sets the value in the Duration in the RTS 802.11 signal to the NAV counter value NAV (RTS) as a standby interval to stop communication operations.

After this, in the communication system, the stations $STA_{11}$, $STA_{12}$, and $STA_{13}$ as destinations receiving the RST 802.11 signal and the RTSadd signal return the CTS 802.11 signals including CTS0 802.11, CTS1 802.11, and CTS2 802.11 as shown in FIG. 11A at the same time, after a predetermined interval SIFS from the reception of the RTSadd signals are received. The access point $AP_1$ receives a plurality of CTS 802.11 signals transmitted at the same time.

Here, at this stage, because the access point $AP_1$, as described above, does not operate as the adaptive array antenna, it is necessary to receive a plurality of CTS 802.11 signals at the same time with one antenna element. Thus, if reception is made as it is, the reception of these signals may become impossible because of collisions among a plurality of CTS signals. To enable such reception, the following three conditions should be satisfied.

The three conditions are that a) the OFDM modulation method is adopted as a modulation method, b) the oscillators in stations $STA_{11}$, $STA_{12}$, and $STA_{13}$ operate so as to compensate frequency differences from that used in the access point $AP_1$, and c) the CTS 802.11 signals returned from stations $STA_{11}$, $STA_{12}$, and $STA_{13}$ have the same data.

Here, a plurality of CTS 802.11 signals have the same content as indicted in FIG. 11A and the OFDM modulation method is adapted. Therefore, if the stations $STA_{11}$, $STA_{12}$, and $STA_{13}$ operate so as to compensate differences in clock from the access point $AP_1$ upon reception of the RTS signal, with that the deviation is within the guard interval, these plural waves can be received with one antenna element at the same time, as similar to the process for delayed waves, though a plurality of CTS 802.11 signals including the same contents are transmitted.

On the other hand, the conventional type of the station $STA_{14}$ receives a plurality of CTS 802.11 signals transmitted from the stations $STA_{11}$, $STA_{12}$, and $STA_B$ at the same time. This reception is possible because of the above-mentioned reason. In response to the CTS 802.11 signals transmitted from the respective stations $STA_{11}$, $STA_{12}$, and $STA_{13}$, the conventional type of the station $STA_{14}$ sets the value in the Duration in the CTS 802.11 signal to the NAV counter values NAV (CTS) as a standby interval to stop communication operations. In this operation, a difference in setting timings of the NAV counter values does not occur because the CTS 802.11 signals are returned at the same time and thus, the CTS 802.11 signals can be received at the same time.

After this, the stations $STA_N$, $STA_{12}$, and $STA_{13}$ receiving the RST 802.11 signal return CTSadd signals including CTS0add, CTS1add, and CTS2add time-divisionally to avoid overlap in time base. The CTSadd signal has the format as earlier shown in FIG. 11B in which the addresses of the stations $STA_{11}$, $STA_{12}$, and $STA_{13}$, are written as the transmission sources at the Transmitter Addresses TA, so that the access point $AP_1$ can know the station which transmits the received CTS signal.

Then, the access point $AP_1$ obtains transfer functions between each of antenna elements 20 of the stations $STA_{11}$, $STA_{12}$, and $STA_{13}$ and each of a plurality of its antenna elements $10_1$, $10_2$, and $10_3$ on the basis of the RANDPAT in a plurality of the received CTSadd signals and synthesizes the weightings on the basis of the obtained transfer functions. With this, the access point $AP_1$ functions as an adaptive array antenna. That is, when a predetermined interval SIFS elapsed after reception of the last CTSadd signal including CTS2add, the access point $AP_1$ starts transmitting data (Fragment 0-0, Fragment 1-0, and Fragment 2-0) by the space division multiplexing to respective stations $STA_{11}$, $STA_{12}$, and $STA_{13}$ with a plurality of antenna elements $10_1$, $10_2$, and $10_3$.

The operation after this is the same as the description earlier made with FIG. 9. Respective stations $STA_{11}$, $STA_{12}$, and $STA_{13}$ return ACK signals including ACK 0-0, ACK 1-0, and ACK 2-0 at the same time when a predetermined interval SIFS elapsed after completion of the data transmission from the access point $AP_1$. The access point $AP_1$ directly learns the weightings of the adaptive array antenna with a predetermined adaptive algorithm such as the RLS algorithm on the basis of the RANDPAT in a plurality of the received ACK signals.

Further, in response to the data transmitted from the access point $AP_1$, the conventional type of station $STA_{14}$ sets the time interval described at the Duration in the data to the NAV counter value NAV (Fragment 0) as a standby interval to stop communication operations. Further, in response to the transmission of the ACK signals from respective stations $STA_{11}$, $STA_{12}$, and $STA_{13}$, the conventional type of station $STA_{14}$ sets the time interval described at the Duration of the ACK signals to the NAV counter value NAV (ACK0) to stop communication operations.

In this communication system, according to the protocol mentioned above, communication is carried out with the newly proposed RTS signal, CTS signal, and ACK signal to provide the space division multiplexing with the adoptive array antenna.

As mentioned above, in the communication system, because the CTS 802.11 signals are transmitted at the same time and the CTSadd signals are time-divisionally returned, so that troubles in installation can be reduced, and there is no change in the physical layer, with a result that a simple system structure can be provided.

As mentioned above, in the communication system according to the second embodiment of the present invention, a plurality of stations $STA_{11}$, $STA_{12}$, and $STA_{13}$, receiving the CTS 802.11 signal transmitted from the access point $AP_1$ return the CTS 802.11 signals and time-divisionally return the CTSadd signals. The access point $AP_1$ learns the weightings for the equipped adaptive array antenna to form the directivity. During this, at the first learning, the weightings for the adaptive array antenna are obtained by acquiring the transfer functions on the basis of the RANDPAT in a plurality of the time-divided CTS signals. At or after the second learning, the weightings for the adaptive array antenna is directly obtained on the basis of the RANDPAT in a plurality of ACK signals which are space division multiplexed. Thus, while the coexistence with the station operating according to the conventional protocol is possible, the space division multiplexing in the downlink communication from the access point $AP_1$ to the stations $STA_{11}$, $STA_{12}$, and $STA_{13}$ can be provided, so that the communication capacity of the network can be extremely increased.

Further, in this communication system, like the first embodiment, though the coexistence with the station operating according to the conventional protocol is possible, the space division multiplexing is provided with the adaptive array antenna only by addition of a new format only in the MAC layer without modification in the physical layer. Thus, the system, having an extremely simple structure can be provided at a low cost.

In addition, in this communication system, after receiving the RTS signal, respective stations can receive the CTS 802.11 signals at the same time. This structure eliminates the problem about difference in the reception timing of the CTS signals to avoid carelessly starting a communication.

Now, a third embodiment is described. In the communication system according to the third embodiment, the CTSadd signals having the format shown in FIG. 11B are transmitted at the same time in addition to the CTS 802.11 signals having the format shown in FIG. 11A. Further, in this communication system, during the formation of the directivity through learning the weightings for the adaptive array antenna, the access point $AP_1$ does not obtain the transfer functions on the basis of a plurality of the CTSadd signals which are space division multiplexed, but directly obtains the weightings for the adaptive array antenna on the basis of a plurality of CTSadd signals which are space division multiplexed.

Here, the communication system according to the third embodiment is provided in the same network in structure as that shown in FIG. 1, and the access points and stations have the same structures as those shown in FIGS. 2 and 3, respectively. Further, the format of the RTS signal is the same as that shown in FIGS. 10A and 10B and the format of the CTS signal is the same as that shown in FIGS. 11A and 11B. Thus, the corresponding parts to the first and embodiments are designated with the same references and thus, the detailed descriptions are omitted.

In the communication system according to the third embodiment, returning the CTSadd signals at the same time in addition to the CTS 802.11 signals eliminates the overhead due to the time-divisional transmission in the communication systems according to the first and second embodiments.

More specifically, the RTS signals and the CTS signals transmitted and received in this communication system are the same as those shown in FIGS. 10A, 10B, 11A and 11B, and the ACK signal have the same structure as that shown in FIG. 8. However, at the portion of the RANDPAT in the CTS signal, the random sequence is not common to all CTS signals, but inherent random sequences different from each station are written to directly learn the weightings for the adaptive array antenna on the basis of the RANDPAT in the CTS signal with a predetermined adaptive algorithm such as the RSL algorithm or the like.

This communication system, using the RTS signal, the CTS signal, and the ACK signal having the frame formats as mentioned above, executes communication in accordance with the following protocol. Here, for convenience of explanation, it is also assumed that out of four stations $STA_{11}$, $STA_{12}$, $STA_{13}$, and $STA_{14}$, the station $STA_{14}$ is the conventional type of station that cannot deal with the new format, other three stations $STA_{11}$, $STA_{12}$, and $STA_{13}$ operate in the space division multiplexing as the second communication stations, and the access point $AP_1$ as the first communication station tries to transmit and receives data.

Figure 13:
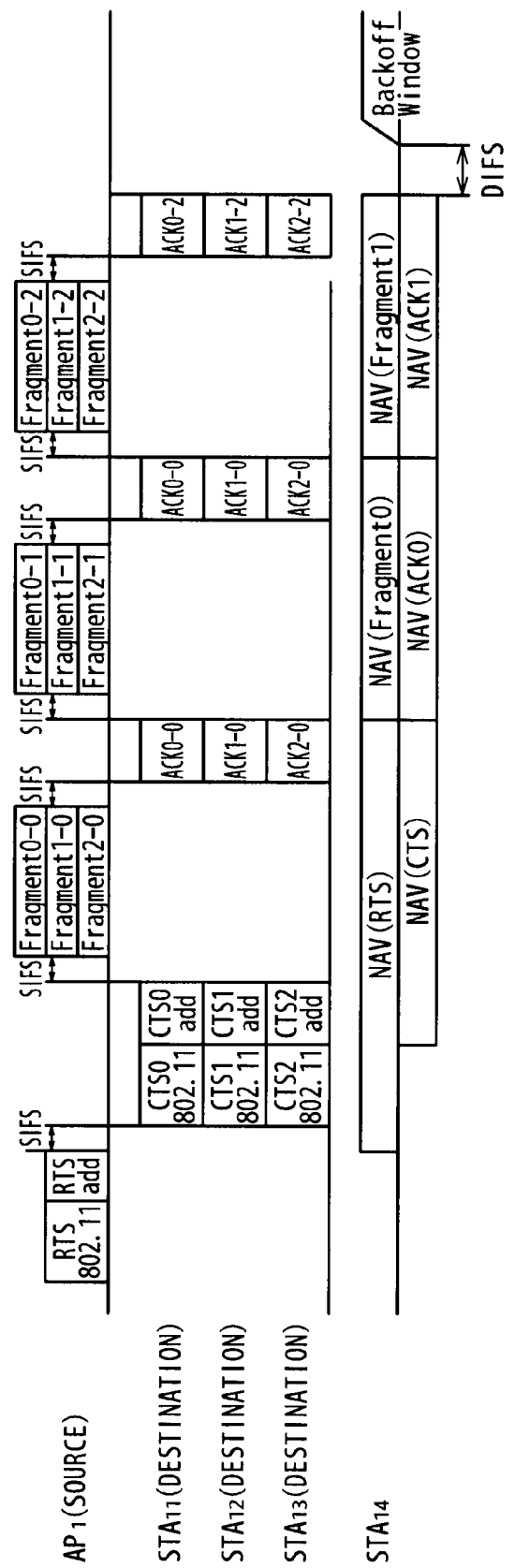
FIG. 13 is a time chart illustrating the protocol according to a third embodiment.
Figure 14:
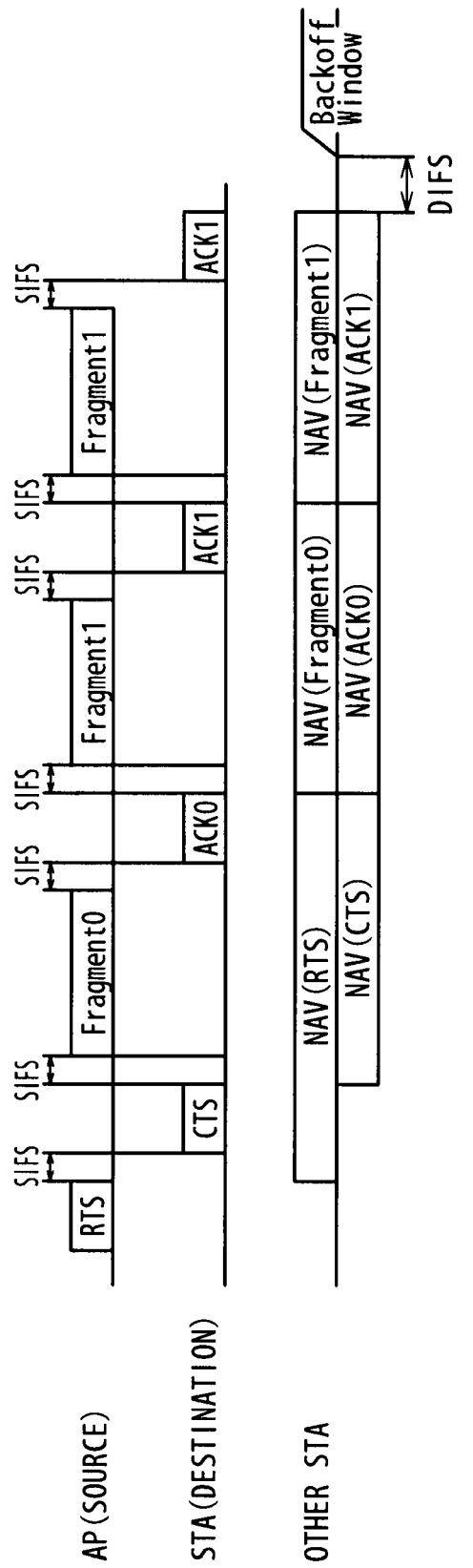
FIG. 14 is a time chart illustrating the protocol according to the related art in a wireless LAN according to the IEEE 802.11 standard.

In this communication system, as shown in FIG. 13, the access point $AP_1$ senses the carrier in advance and transmits the RTS signal upon confirming that other station or other access points are not communicating. After this, the RTS 802.11 signal and the RTSadd signal are transmitted in individual physical packets. Here, as mentioned earlier, at this stage, the adaptive array antenna is non-directional because the weightings are not learned. The RTS signal has the format as mentioned above and shown in FIGS. 10A and 10B, in which the addresses of stations $STA_{11}$, $STA_{12}$, and $STA_{13}$ are written as the candidates for the space division multiplexing at the three Receiver Addresses RA, RA2, and RA3, respectively.

On the other hand, in response to the RTS 802.11 signal and RTSadd signal transmitted from the access point $AP_1$, the conventional type of the station $STA_{14}$ sets the value in Duration in the RTS 802.11 signal to the NAV counter value NAV (RTS) as a standby interval to stop communication operations. After this, in the communication system, the stations $STA_{11}$, $STA_{12}$, and $STA_{13}$ as destinations receiving the RST 802.11 signal and the RTSadd signal return the CTS 802.11 signals including CTS0 802.11, CTS1 802.11, and CTS2 802.11 at the same time. The access point $AP_1$ receives a plurality of the CTS 802.11 signals transmitted at the same time. Here, at this stage, because the access point $AP_1$, as described above, does not operate at an adaptive array antenna, it is necessary to receive a plurality of CTS 802.11 signals at the same time with one antenna element. However, as described in the second embodiment, it is possible to receive them at the same time with one antenna element.

On the other hand, the conventional type of the station also receives a plurality of CTS 802.11 signals transmitted from the stations $STA_{11}$, $STA_{12}$, and $STA_{13}$ at the same time. The reception is possible because of the above-mentioned reason. In response to the CTS 802.11 signals transmitted from the respective stations $STA_{11}$, $STA_{12}$, and $STA_{13}$, the conventional type of the station $STA_1$, sets the value in the Duration in the CTS 802.11 signal to the NAV counter values NAV (CTS) as a standby interval to stop communication operations.

After this, the stations $STA_{11}$, $STA_{12}$, and $STA_{13}$ receiving the RST 802.11 signal return CTSadd signals including CTS0add, CTS1add, and CTS2add at the same time. The CTSadd signal has the format as earlier shown in FIG. 11B in which addresses of the stations $STA_{11}$, $STA_{12}$, and $STA_{13}$, are written as transmission sources at the Transmitter Addresses TA, so that the access point $AP_1$ can know the station which transmits the received CTS signal.

Then, the access point $AP_1$ obtains the transfer functions between each of antenna elements 20 of the stations $STA_{11}$, $STA_{12}$, and $STA_{13}$ and each of a plurality of antenna elements $10_1$, $10_2$, and $10_3$ on the basis of the RANDPAT in a plurality of the received CTSadd signals and directly learns the weightings with a predetermined adaptive algorithm such as the RLS algorithm or the like. With this, the access point $AP_1$ functions as an adaptive array antenna. That is, when a predetermined interval SIFS elapsed after reception of the last CTSadd signal including CTS2add, the access point $AP_1$ starts transmitting data (Fragment 0-0, Fragment 1-0, Fragment 2-0) by the space division multiplexing to respective stations $STA_N$, $STA_{12}$, and $STA_{13}$ with a plurality of antenna elements $10_1$, $10_2$, and $10_3$.

Here, a plurality of the CTSadd signals transmitted at the same time include the different content as mentioned above. However, because the conventional type of the station $STA_{14}$ sets a value to the NAV counter value NAV (CTS) on the basis of the CTS 802.11 signal, it neglects a plurality of the CTSadd signals transmitted at the same time, so that there is no problem.

The operation after this is the same as the description earlier made with FIG. 9. The stations $STA_{11}$, $STA_{12}$, and $STA_{13}$ return the ACK signals ACK 0-0, ACK 1-0, ACK 2-0 at the same time when a predetermined interval SIFS elapsed after completion of the data transmission from the access point $AP_1$. The access point $AP_1$ directly learns the weightings of the adaptive array antenna with a predetermined adaptive algorithm such as the RLS algorithm on the basis the RANDPAT in a plurality of the received ACK signals.

Further, in response to the data transmitted from the access point $AP_1$, the conventional type of station $STA_{14}$ sets the time interval described at the Duration in the data to the NAV counter value NAV (Fragment 0) as a standby interval to stop communication operations. Further, in response to the transmission of the ACK signals from respective stations $STA_{11}$, $STA_{12}$, and $STA_{13}$, the conventional type of station $STA_{14}$ sets the time interval described at the Duration of the ACK signals to NAV counter value NAV (ACK0) to stop communication operations.

In this communication system, according to the protocol mentioned above, the communication is carried out with the newly proposed RTS signal, CTS signal, and ACK signal to provide the space division multiplexing with the adaptive array antenna.

As mentioned above, in the communication system according to the third embodiment, while the coexistence with a station operating according to the conventional protocol is possible, the space division multiplexing in the downward transmission from the access point $AP_1$ to the stations $STA_{11}$, $STA_{12}$, and $STA_B$ can be provided, so that the communication capacity of the network can be extremely increased.

Further, in the communication system, the CTSadd signals are simultaneously returned in addition to the CTS 802.11. As a result, this structure reduces the occupation interval of the CTS signal, so that the overhead can be eliminated.

As mentioned above, in the communication system according to the embodiments of the present invention, the new frame formats for the RTS signal, the CTS signal and the ACK signal are proposed, and the access point transmits the RTS signal representing at least addresses of a plurality of stations requested to receive the data and receives a plurality of CTS signals transmitted from a plurality of stations. Thus, the space division multiplexing communication can be provided between the access point having the adaptive array antenna and a plurality of stations with the coexistent with the station operating according to the conventional protocol.

Thus, this communication system can extremely increase a communication capacity of a network and thus can provide the application for transmitting a large capacity of data as in the case that a predetermined server transmits a plurality of streams to a plurality of television sets, which is impossible in the conventional wireless LAN.

This invention is not limited to the above-mentioned embodiments. For example, the above embodiments are described with the case in which this invention is applied to the wireless LAN according to IEEE 802.11 standard. However, this invention is applicable to any communication system executing the same control as the control using the RTS signal, the RTS signal, the CTS signal, and the ACK signal.

Further, the above embodiments are described with assumption that in the so-called infrastructure mode, only the access point has the function of the adaptive array antenna. However, this invention is applicable to the case where a plurality of stations has the function of adaptive array antenna. That is, this invention is applicable to the so-called ad hoc mode. Further, any type of directive antenna is possible to use instead of the adaptive array antenna described in the embodiment.

As mentioned above, it should be understood that changes and modifications in the present invention may be made according to circumstances without departing from the spirit or scope of the present invention.

What is claimed is:

1. A communication method for carrying out data communication among a plurality of communication stations, comprising:

transmitting a request to send signal frame from a first station to at least one other communication station, the request to send signal frame indicating a request to initiate data transmission;

receiving the request to send signal frame transmitted from said first communication station at a second communication station; and transmitting a clear to send signal frame from said second communication station to at least one of the plurality of communication stations, in reply to the request to send signal frame, wherein said first communication station receives the clear to send signal frame transmitted from said second communication station, the request to send signal frame received by said second communication station includes an address of said second communication station, the request to send signal frame includes at least a first section and a second section, the first section including information used to indicate an interval of time during which a third communication station having an address that is not included in the second section does not do its communication, and the second section including the address of said second communication station, and said first section is a format that the communication station having an address that is not included in the request to send signal frame can interpret, and said second section is a format that the communication station having an address that is not included in the request to send signal frame cannot interrupt.

2. A communication system for carrying out data communication among a plurality of communication stations, comprising:

a first communication station configured to transmit a request to send signal frame to at least one other communication station, the request to send signal frame indicating a request to initiate data transmission; and a second communication station configured to receive the request to send signal frame transmitted from said first communication station, and to transmit a clear to send signal frame to at least one of the plurality of communication stations in reply to the request to send signal frame, wherein said first communication station receives the clear to send signal frame transmitted from said second communication station, the request to send signal frame received by said second communication station includes an addresses of said second communication station, the request to send signal frame includes at least a first section and a second section, the first section including information used to indicate an interval of time during which a third communication station having an address that is not included in the second section does not do its communication, and the second section including the address of said second communication station, and said first section is a format that the communication station having an address that is not included in the request to send signal frame can interpret, and said second section is a format that the communication station having an address that is not included in the request to send signal frame cannot interrupt.

3. A communication apparatus for transmitting data to other communication stations, comprising:

a data processing section that generates a request to send signal frame indicating a request to initiate data transmission, the request to send signal frame including an address of a second communication station that is intended to receive the data transmission; and a communication section that transmits the request to send signal frame, and receives a clear to send signal frame from said second communication station, in reply to the request to send signal frame, wherein the request to send signal frame includes at least a first section and a second section, the first section including information used to indicate an interval of time during which a third communication station having an address that is not included in the second section does not do its communication, and the second section including the address of said second communication station, said first section is a format that the communication station having an address that is not included in the request to send signal frame can interpret, and said second section is a format that the communication station having an address that is not included in the request to send signal frame cannot interrupt.

4. A communication apparatus for receiving data transmitted from other communication stations, comprising:

a communication section that wirelessly transmits and receives data; and a data processing section that processes the data transmitted and received by the communication device, wherein when the communication apparatus receives a request to send signal frame requesting a transmission upon the start of the data transmission in transmission origin station, said data processing section generates a clear to send signal frame, the request to send signal frame includes at least a first section and a second section, the first section including information used to indicate an interval of time during which a third communication station having an address that is not included in the second section does not do its communication, and the second section including the address of said second communication station, and said first section is a format that the communication station having an address that is not included in the request to send signal frame can interpret, and said second section is a format that the communication station having an address that is not included in the request to send signal frame cannot interrupt, said communication section transmits said clear to send signal frame, and the request to send signal frame describing at least an address of a communication station that is intended to receive the data transmission.

* * * * *